(12) United States Patent
Ballew

(10) Patent No.: US 10,127,830 B2
(45) Date of Patent: Nov. 13, 2018

(54) PLACE VALUE TEACHING DEVICE

(71) Applicant: Tony Jay Ballew, Salt Lake City, UT (US)

(72) Inventor: Tony Jay Ballew, Salt Lake City, UT (US)

( * ) Notice: Subject to any disclaimer, the term of this patent is extended or adjusted under 35 U.S.C. 154(b) by 215 days.

(21) Appl. No.: 15/043,485

(22) Filed: Feb. 12, 2016

(65) Prior Publication Data

US 2016/0240103 A1    Aug. 18, 2016

Related U.S. Application Data

(60) Provisional application No. 62/115,155, filed on Feb. 12, 2015.

(51) Int. Cl.
  *G09B 19/02* (2006.01)
  *G09B 1/20* (2006.01)

(52) U.S. Cl.
  CPC .............. *G09B 19/02* (2013.01); *G09B 1/20* (2013.01)

(58) Field of Classification Search
  None
  See application file for complete search history.

(56) References Cited

U.S. PATENT DOCUMENTS

| | | | | |
|---|---|---|---|---|
| 1,658,069 A | * | 2/1928 | Wood | G01C 22/00 116/299 |
| 2,476,580 A | * | 7/1949 | Bergman | G09B 19/02 273/143 R |
| 2,643,467 A | * | 6/1953 | Goodwin | G09B 19/02 434/206 |
| 3,360,874 A | * | 1/1968 | Myers | G09B 19/02 235/114 |
| 4,593,263 A | * | 6/1986 | Peckworth | G07C 5/0841 235/97 |
| 4,970,377 A | * | 11/1990 | Corcoran | G01C 22/00 235/139 R |
| 5,200,596 A | * | 4/1993 | Coffey | G01C 22/00 235/131 FD |

(Continued)

FOREIGN PATENT DOCUMENTS

| | | | | | |
|---|---|---|---|---|---|
| GB | 246174 A | * | 1/1927 | ............. | G09B 19/02 |
| GB | 737681 | * | 12/1952 | ............. | G09B 19/01 |

*Primary Examiner* — Sunit Pandya

(57) ABSTRACT

An improved numeracy and place-value educational device which accurately displays a range of both whole-number and decimal place-value properties. A conventional counting-wheel odometer comprising a plurality of sequentially numbered counting wheels (10a-10f) and motion transfer components (not shown) is supported by a frame (12). A decimal carrier (20) moves laterally across a portion of the frame (16). The lateral movement allows a decimal point (20') to precede or follow any numeral in a specific row displayed by the counting wheels (10a-10f). A place value band (18) displays place value names (19a-19f). Its movement, in unison with the decimal carrier (20) and a moveable comma (241, maintains the correct orientation of place-value names (19a-19f) in relation to the decimal point (20') in unalterable fashion. Force is applied to the motion transfer components which selectively rotate the counting wheels (10a-10f). A sequential, dynamic display of both whole-number and decimal place-value names, notations, and properties is presented consistently, accurately, and objectively.

1 Claim, 4 Drawing Sheets

(56) References Cited

U.S. PATENT DOCUMENTS 6,142,784 A * 11/2000 Wood .................... G09B 5/065
                                                        434/188
6,729,883 B1 * 5/2004 Raiche .................... G09B 1/00
                                                        434/188

* cited by examiner

PLACE VALUE TEACHING DEVICE

CROSS-REFERENCE TO RELATED APPLICATIONS

This application claims the benefit of provisional patent application Ser. No. U.S. 62/115,155, filed 2015 Feb. 12 by the present inventor.

FEDERALLY SPONSORED RESEARCH

Not Applicable

SEQUENCE LISTING OR PROGRAM

Not Applicable

BACKGROUND OF THE INVENTION

Field of Invention

This invention relates to educational devices, specifically to such devices that are used for observing place-value names, notation, and properties of whole numbers and decimal numbers. Impetus: Introduces invention in more complete terms of what is presented and was previously presented in initial application.

Prior Art

Various aids and devices have long been used to assist students in their understanding of mathematic concepts. In using these devices, teachers ideally engage various student learning modalities. The recognized modalities are informally defined as seeing, touching, hearing, and moving. In the introductory stages of numeracy, the modality of seeing, or observation, is regularly and successfully used.

As instruction progresses to operations beyond single digits, place-value names, such as Ones and Tens, and place-value properties must be explored. Accordingly, many devices have been introduced to help explain place-value concepts. Until now, these devices have largely minimized the modality of observation and instead rely heavily on teacher explanation, or the hearing modality. The effectiveness of teacher explanation, as well as teacher confidence with the use of such devices, often varies widely between classrooms. As a result, the student's foundational, place-value understanding and general interest in mathematics may be placed at risk, delayed, or severely compromised. The effects of these problems and weaknesses are perpetuated when new place-value properties are revisited in the study of decimal place value.

Along with the disadvantages of the prior art devices regarding learning modalities, other weaknesses are notable. Many of these devices rely on cognitive input or numeric manipulation of individual digits or individual place names. Each are therefore capable of generating incorrect answers or of reinforcing misconceptions. U.S. Pat. No. 2,804,699 to Robinson (1957) uses numbered and named tiles with which to display various numeric values and place names. This device uses a moveable decimal point, and the names and values of various places may be randomly chosen. As such, this device requires continual teacher oversight and instruction to correct faulty manipulations and subsequent misconceptions.

Because the relevant, prior art place-value devices rely on teacher explanation and skill, they are subjective in nature. As such, they do not assure a consistent, accurate display of decimal and whole-number place-value concepts. U.S. Pat. No. 6,729,883 to Raiche (2004) teaches the use of a device with numbered wheels with which to display numeric values. This device uses a non-moveable decimal point to accommodate the display of both decimal and whole-number place values. However, the place values may be randomly chosen, and the wheels may be independently rotated in segmented or non-sequential fashion. It may thus lend itself to inefficient or inconsistent presentations of concepts.

Several other numeric educational devices use sequential numbers printed on rotatable surfaces. U.S. Pat. No. 2,476,580 to Bergman (1949) teaches the use of a device having numbered wheels, an answer disk, and interchangeable operations symbols. This device uses a sequential display of one and two-digit whole numbers to solve single-digit addition and subtraction problems. Its effective range of correct answers, without disassembly of the device, is 0-18. Its total stated range of sequential number display is 0-59. This device cannot display an unbroken numeric sequence of 0-99. Its place values are limited in scope to a narrow range of sequences in the Ones and Tens places only. It accommodates neither the display of decimal place values, nor the observation of decimal place value properties.

Thus, in the field of place-value teaching devices, nowhere in the prior art is found a device which can assure an accurate presentation of the sequential, dynamic nature of whole-number and decimal place value names, notation, and properties in a consistent, objective fashion that is independent of the variables of user skill and resistant to user error.

Objects and Advantages

Accordingly, several objects and advantages of the present invention are to provide a numeracy and place-value educational device:
(a) which is resistant to user error;
(b) which requires no teacher oversight or instruction for use;
(c) which uses the modalities of observation, touch, and movement to help students acquire an understanding of place-value concepts;
(d) in which a display of individual digits is not randomly chosen;
(e) of such that only a sequential increase or decrease of numeric values, or a reset to zero, is displayed;
(f) of such that a correct sequence of numeric values is displayed regardless of the position of a decimal point or of the place values under consideration;
(g) which is equally effective for display and observation of single or multi-digit whole-number piece-value names, notation, or properties, as well as single or multi-digit decimal place-value names notation, or properties;
(h) to provide a place-value educational device which is capable of accurately testing student predictions of decimal and whole-number place value properties.

Further objects and advantages of the present invention are to provide a numeracy and place-value educational device which, through a single device, provides continuity to the idea of numeracy and place value as a single progression of concepts; which, through a single device, is easily adapted for use throughout the entire progression of numeracy and place-value concepts; which uses interactive observation of dynamic properties to engage student learning styles informally identified as seeing, touching, and moving; which may be used for display and observation of addition and subtraction properties; which may be used for decimal-fractional equivalency instruction; and which may be used for instruction in monetary notation.

Still further objects and advantages will become apparent from a consideration of the drawings and ensuing description.

SUMMARY

In accordance with the present invention a numeracy and place-value educational device which, with only an application of force, converts force into a sequential, unalterably correct display of the dynamic nature, proper nomenclature, accurate notation, and consistent properties of whole-number and decimal place-value concepts.

DRAWINGS

Figures

REFERENCE NUMERALS

| | | | |
|---|---|---|---|
| 10a-10f | Counting wheels | 12 | Frame |
| 12' | Window frame | 14 | Removable hand crank |
| 16 | I-beam portion of frame | 17 | Reset knob |
| 18 | Place-value band | 18x | Touch-screen place-value band |
| 19a-19f | Place-value names | 19bx, 19cx | Digital place-value names |
| 20 | Moveable Decimal carrier | 20' | Moveable Decimal point |
| 20x | Digital Decimal point | 22 | Hook and loop fasteners |
| 22' | Hook and loop fastener | 24 | Comma carrier |
| 24' | Comma | 24x | Digital comma |
| 26 | Slot | 28 | Variable-speed motor |

DETAILED DESCRIPTION

FIGS. 1-5—Preferred Embodiment

Figure 1:
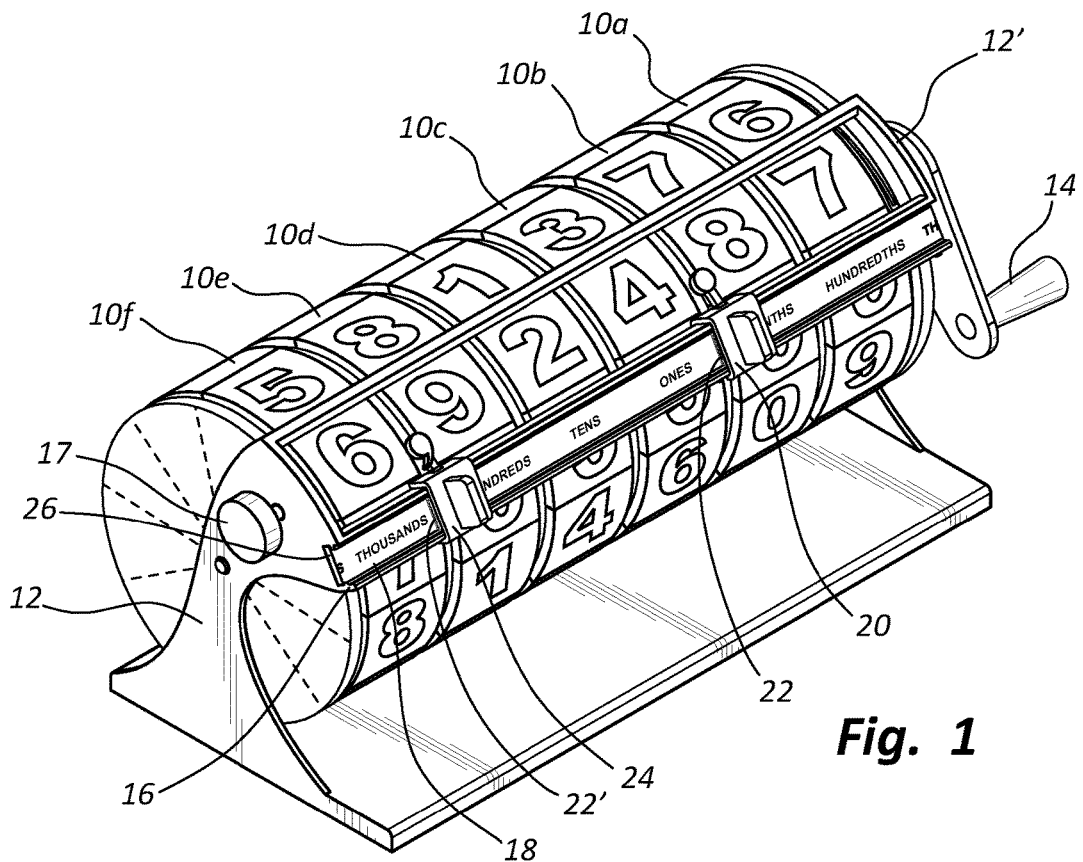
FIG. 1 shows a perspective view of the preferred embodiment

FIG. 1 shows a perspective view of my educational device. This device uses a conventional counting-wheel odometer. This style of odometer is a well-known article of trade. A plurality of counting wheels (10a-10f) are rotatably mounted on a shaft. Each counting wheel is sequentially and identically numbered with digits 0-9. The counting wheels are interconnected by conventional motion transfer components (not shown) which are located between the wheels. These transfer components are designed and assembled in a fashion to assist and govern sequential numeric display. The counting wheels range in order from the rightmost, or lowest order counting wheel (10a) to the leftmost, or highest order counting wheel (10f). The odometer assembly is supported by a frame (12). A hand crank (14) is connected to the motion transfer components. In this embodiment, translucent counting wheels are preferred. This allows students to observe the mechanical operation of the pawls, ratchet springs, pinion gears, and other members of the motion transfer components. Opaque counting wheels of various colors may also be used.

Figure 2:
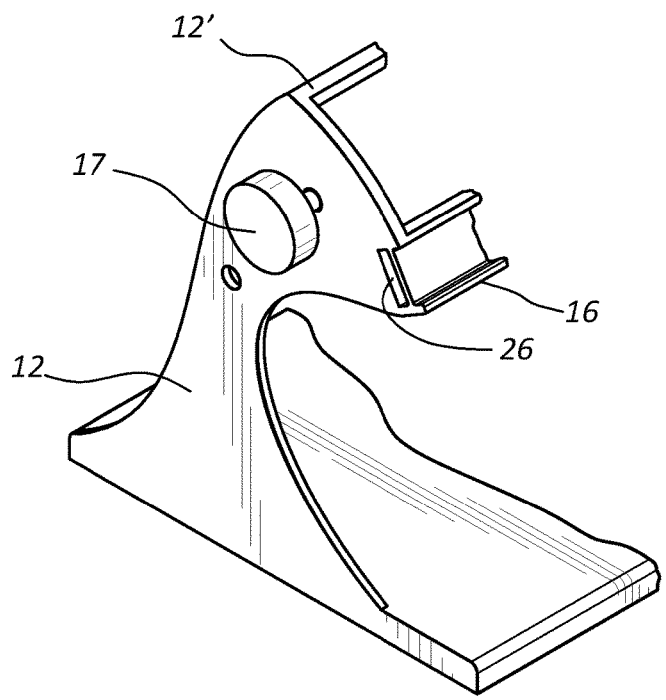
FIG. 2 shows a detail of the frame components

FIG. 2 shows a detail of the frame (12) and its components. The upper portion of the frame is formed in such a fashion that a window frame (12') is provided. The position of the window frame (12') in relation to the counting wheels (10a-10f) is such that a single row of digits is framed. The specific row of digits framed is the row in which sequential changes in numeric value will occur. The lower horizontal edge of the window frame (12') is in the shape of an I-beam (16). A re-set knob (17) is located on the side of frame (12) and is connected to the motion transfer components. The I-beam cross-sectional shape of the lower portion of the window frame is preferred. However, this portion of the frame could be one of many different shapes including square, channel, angle, or inverted tee.

Figure 3:
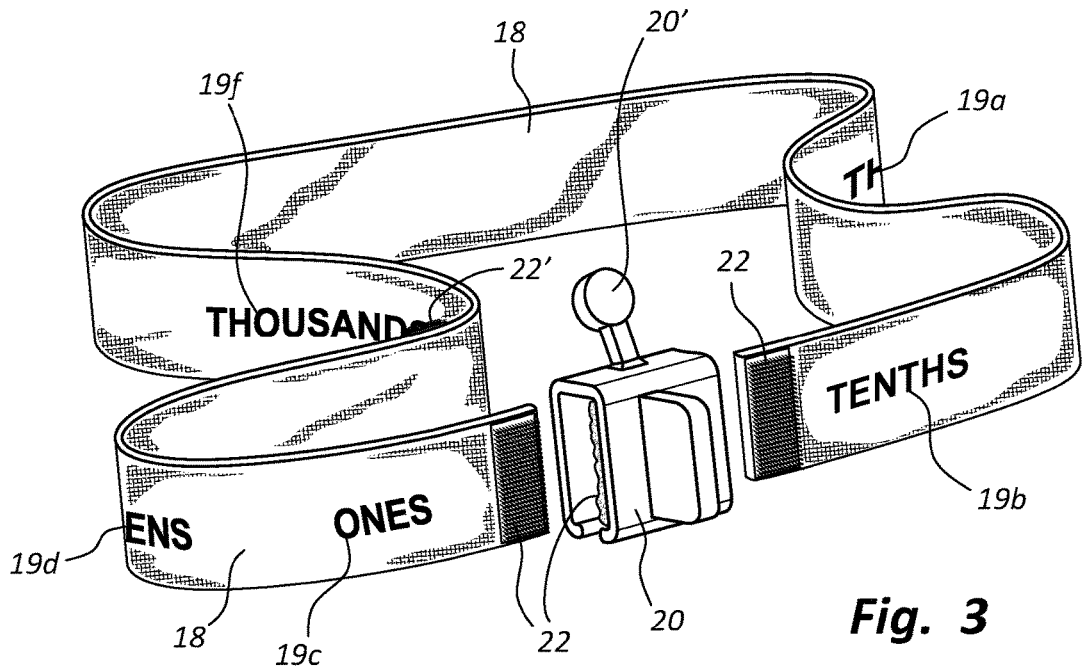
FIG. 3 shows the decimal carrier and place value band

FIG. 3 shows a detail of a moveable decimal carrier (20) and a place-value band (18). A decimal point (20') is positioned on the upper surface of the carrier (20). The band (18) is labeled with place-value names (19a-19f). The quantity of place-value names appearing on the place-value band is determined by the quantity of place values represented, which is ultimately determined by the number of counting wheels used. For each counting wheel, one whole-number place name and one decimal place name appear on the place-value band.

Figure 4:
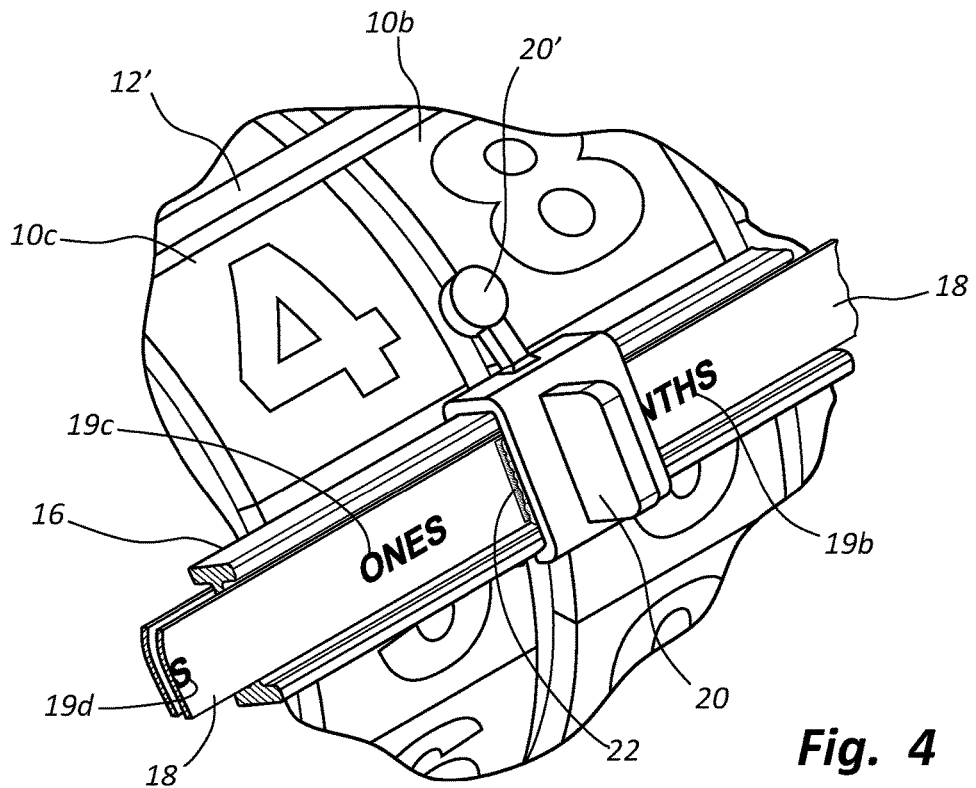
FIG. 4 shows a detail of the place-value band mounted on the I-beam portion of the frame

FIG. 4 shows the place-value band (18) in position. The band (18) is circumferentially positioned around the I-beam (16) by passing through a slot (26) in the frame (12) at each end of the I-beam (16). The ends of the band are joined together at the front of the I-beam (16) by hook and loop fasteners (22). The moveable decimal carrier (20) is located on the I-beam (16) so as to conceal the fasteners (22) of band (18). The mating surface of the hook and loop fastener (22) positioned inside the carrier (20) engages the exposed surface of the fastener (22) of band (18). By this engagement of fasteners, the orientation of place-value names (19a-19f) with the moveable decimal point (20') is unalterably correct, remaining constant.

Figure 5:
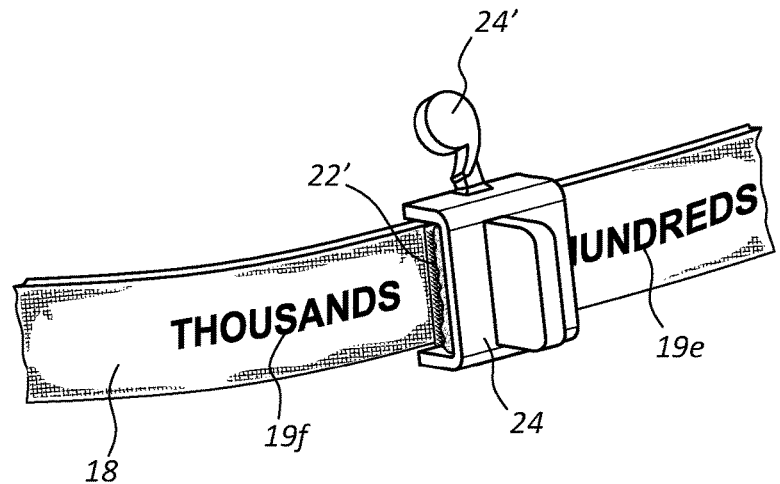
FIG. 5 shows a detail of the comma carrier

FIG. 5 shows a detail of a comma carrier (24) with an affixed comma (24'). A hook and loop fastener (22') is positioned on the back of carrier (24). A hook and loop fastener (22') is also located on the place value band (18) between the Hundreds place-value name (19e) and Thousands place-value name (19l). The carrier (24) is positioned against fastener (22') of the band (18) so that the fasteners are engaged. By this engagement of fasteners, the comma maintains its correct orientation in relation to the place-value names displayed.

OPERATION

Preferred Embodiment—FIGS. 1, 4, 5

A numeric display, formed by a plurality of counting wheels (10a-10f), is viewed through the window frame (12'), or window. A reset knob (17) is rotated so that only zeros are displayed. Force is applied to a hand crank (14) so that the crank rotates in a circular motion.

The movement of the crank translates the applied force to a series of motion transfer components (not shown) inside the counting wheels (10a-10f). The motion transfer components govern the sequential nature of the numeric display, transferring the crank's rotational energy to the rightmost, or lowest order counting wheel (10a). When the lowest order counting wheel reaches nine-tenths of its rotation, the motion transfer components engage the next highest order counting wheel (10b). This engagement advances wheel (10b) one-tenth of a revolution, or one numerical division on the circumference. When the lowest order wheel (10a) completes 360° of rotation, the motion transfer components between these two wheels disengage. The lowest order wheel (10a) continues to rotate without interruption, but wheel (10b) is now immobile. When the lowest order wheel (10a) again reaches nine-tenths of a revolution, the process is repeated, and wheel (10b) is again advanced another one-tenth revolution. In this manner, one complete revolution of any counting wheel advances its next highest order counting wheel by one-tenth of a revolution. One revolution is defined as beginning and ending with the numeral 0.

To observe place-value properties of a targeted group of places, a decimal carrier (20), with an affixed decimal point (20'), is moved laterally along an I-beam (16). The decimal carrier (20), along with a place value band (18) and a comma carrier (24), are interconnected and move in unison. The decimal carrier and affixed decimal point (20') is moved into the target location. Place-value names (19a-19f) on the place-value band (18) and a comma (24'), affixed to carrier (24), are thus displayed in proper relation to the decimal point. The reset knob (17) is turned to reset all numerals in the window frame (12') to zero. Force is applied to the hand crank (14), initiating a sequential, dynamic display of whole-number and decimal place-value properties of the targeted group in a consistent, accurate, and objective fashion.

The comma carrier (24) and its affixed comma (24') provide accurate notation of whole numbers. For observation of decimal place-value properties of the ten-thousandths place and smaller, the comma carrier (24) is removed. Removal of the comma carrier allows unrestricted movement of the decimal carrier and place value band.

Additionally, the place-value band is easily removed in order to test student knowledge of place value names.

DESCRIPTION

Figure 6:
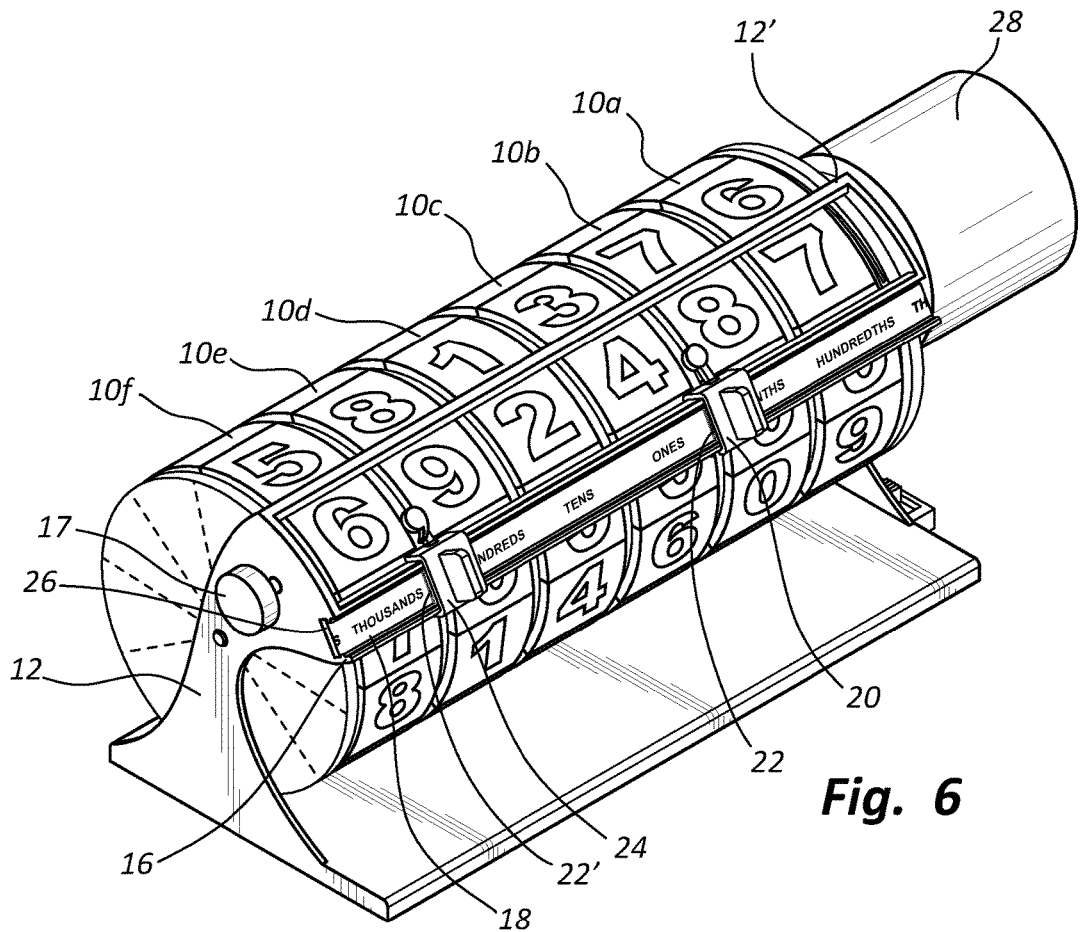
FIG. 6 shows a motorized version of FIG. 1

Alternative Embodiment—FIGS. 6, 1—Motorized Version

FIG. 6 is a perspective view of an alternative embodiment. A variable-speed motor (28) occupies the position of the removable hand crank (14).

OPERATION

Alternative Embodiment—FIG. 6—Motorized Version

A motor (28) is energized to supply the required force necessary to operate the device.

Figure 7:
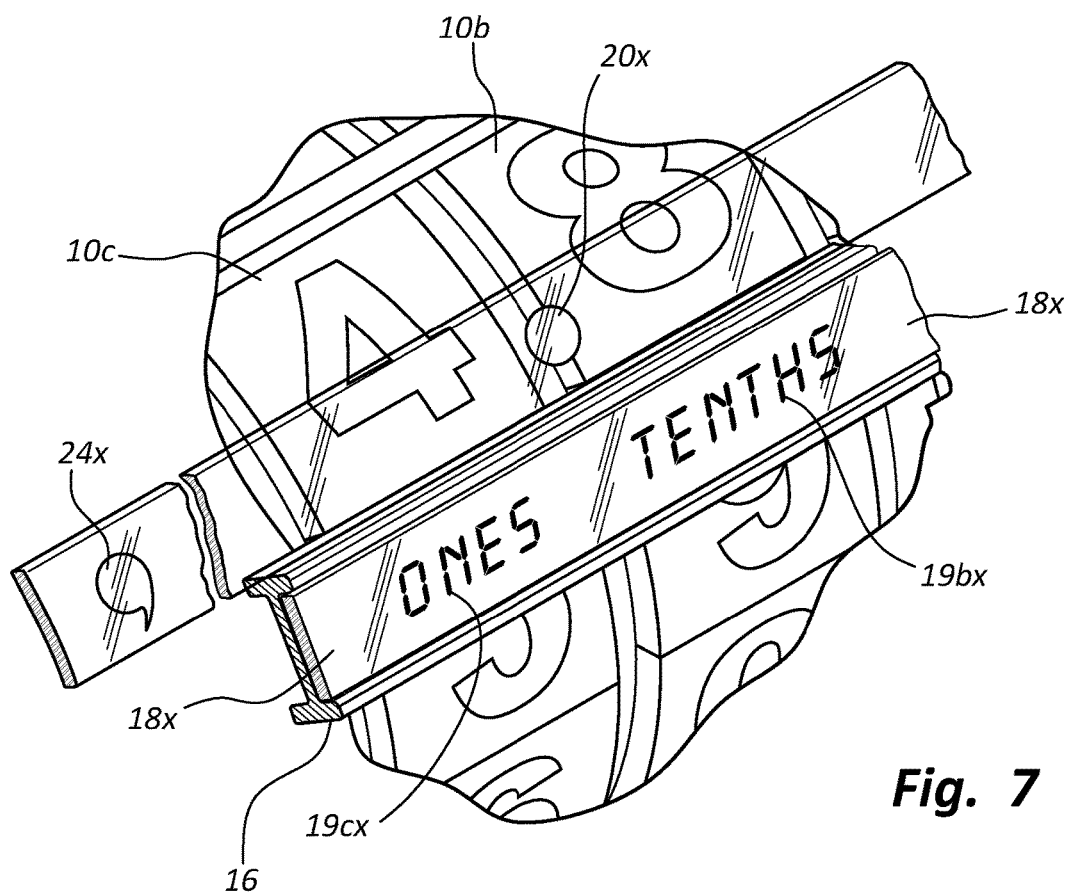
FIG. 7 shows a touch-screen version of the moveable decimal point

Alternative Embodiment—FIG. 7—Digital Decimal Point

There are many possibilities with regard to a display of the moveable decimal point of the present invention. The decimal point (20), comma (24), and place-value band (18) of the preferred embodiment are constructed in a multi-dimensional form to better accommodate and engage student learning modalities of seeing, touching, and moving. Other means of producing these symbols and names are possible, which include but are not limited to other mechanical, electric, or electronic means such as liquid crystal displays, light emitting diodes, or touch-screen display. FIG. 7 shows a touch-screen display (18x) of the moveable decimal point (20x), place-value names (19bx, 19cx), and comma (24x).

Alternative Embodiment—FIGS. 7,1—Digital Decimal Point

To observe place-value properties of a targeted group of places, the touch-screen display (18x) is touched and swiped or dragged until the decimal point (20x), is moved laterally into the target location. Place-value names (19bx-19cx) on the touch-screen display (18x) and a comma (24x) are thus displayed in proper relation to the decimal point. A reset knob (17) of FIG. 1 is turned to reset all numerals in a window frame (12') to zero. Force is applied to a hand crank (14), initiating a sequential, dynamic display of whole-number and decimal place-value properties of the targeted group.

CONCLUSION, RAMIFICATIONS, AND SCOPE OF INVENTION

Thus, the reader will see that the numeracy and place-value educational device of the present invention provides a versatile educational tool which allows students to learn by watching an accurate, dynamic presentation of the changing nature and consistent properties of a wide range of numeracy concepts.

While my above description contains many specificities, these should not be construed as limitations on the scope of the invention, but rather as an exemplification of one preferred embodiment thereof. Many other variations are possible. For example:

Mechanical-style motion transfer components inside the translucent counting wheels are intentionally chosen to provide an enhanced learning experience. The timing of the counting wheels may also be accomplished by means other than mechanical such as actuation via servomotors, or other means.

The numeric display itself may be accomplished by means other than counting wheels, such as a digital numeric display. It is believed, however, that the wheels' tangible nature and movement contribute to a multi-sensory approach to learning.

The frame of the device is shown as modular, or molded as one piece. To facilitate a number of variables, such as conservation of natural resources, or reduction of manufacturing or assembly costs, the frame may be constructed of individual components.

The upper portion of the window frame of the preferred embodiment is not a necessity, but is provided as a focal point for young learners and may be eliminated.

The moveable comma of the preferred embodiment is provided for enhanced accuracy in notation and as an educational aid. The accurate operation of the device is not affected by its absence.

Hook and loop fasteners are used as a fastening means in various locations on the device. This material was chosen to allow quick and economical replacement of damaged parts. Other fastening means, such as snaps or magnetic components, are possible.

Due to classroom dynamics and the need to repeat various procedures and activities, a resettable style of odometer mechanism is favored in the preferred embodiment. Other non-resettable styles may be used and actually preferred in some cases.

Advanced exploration of place-value concepts includes examination of the place-value properties of numeration systems other than the Base-10 system. The scope of the present invention is readily applied to numeration systems of bases other than Base-10. The counting wheels for a numeracy and place-value educational device for a Base-4 system, for example, would display the digits 0-3 equally spaced upon their annular surfaces. With each revolution of a lower order wheel, the motion transfer components would advance the next higher wheel by one-fourth of a turn, or 90°. If a place-value band were used on this embodiment, the place-value names from right to left would read Ones, Fours, Sixteens, Sixty-Fours, and so on. Names to the right of what is known as the decimal point in a Base-10 system would read Fourths, Sixteenths, Sixty-Fourths, and so on, depending on the quantity of place values represented. This iteration would also lend itself to observation of fractional equivalency and the concepts of fraction simplification, or reduction.

Accordingly, the scope of the invention should be determined not by the embodiments illustrated, but by the appended claims and their legal equivalents.

I claim:

1. A conventional odometer assembly of the type comprising a plurality of counting wheels with outer annular surfaces, each of said counting wheels having a sequential series of digits spaced evenly apart on said annular surfaces, motion transfer component means between said counting wheels for receiving and transferring rotational force, an axle means for rotatably securing said counting wheels adjacent to one another, a support means for supporting said axle whereby said counting wheels may freely rotate, and a means for transferring said rotational force to said motion transfer components, the improvement comprising,
   (a) a display means whereby a decimal point symbol and a plurality of place value names are displayed in unalterably correct relationship to one another,
   (b) said display means also providing means for lateral repositioning of said decimal point symbol and place value names in relationship to said digits so that said decimal point symbol and place value names remain in said unalterably correct relationship to one another, and
   (c) a support means to support said display means at predetermined height in relation to said digits so that said decimal point symbol maintains an elevation that is within reasonable proximity to the traditional location of such said decimal point symbol in relationship to said digits.

* * * * *

UNITED STATES PATENT AND TRADEMARK OFFICE
CERTIFICATE OF CORRECTION

PATENT NO. : 10,127,830 B2
APPLICATION NO. : 15/043485
DATED : November 13, 2018
INVENTOR(S) : Tony Jay Ballew It is certified that error appears in the above-identified patent and that said Letters Patent is hereby corrected as shown below:

On the Title Page

Item (57), Line 13 of the Abstract:
Please correct the reference numeral for the moveable comma. It incorrectly appears as (241 as opposed to the correctly submitted (24').

In the Specification

Column 1, Lines 24-26, under Background of Invention, Field of invention, please delete the following line:
"Impetus: introduces invention in more complete terms of what is presented and was previously presented in initial application.".

Column 2, Line 48, section (g) under Objects and Advantages:
Please correct misspelling from piece value to correctly submitted place-value.

Column 4, Line 47:
Please correct the reference numeral for the place value name. It incorrectly appears as (191) as opposed to the correctly submitted (19f).

Signed and Sealed this
Twenty-second Day of October, 2019

Andrei Iancu
*Director of the United States Patent and Trademark Office*